US008811236B2

(12) United States Patent
You

(10) Patent No.: US 8,811,236 B2
(45) Date of Patent: Aug. 19, 2014

(54) INTERACTION METHOD AND DEVICE BETWEEN RESOURCE AND ADMISSION CONTROL SYSTEMS

(75) Inventor: Jianjie You, Guangdong (CN)

(73) Assignee: ZTE Corporation (CN)

( * ) Notice: Subject to any disclaimer, the term of this patent is extended or adjusted under 35 U.S.C. 154(b) by 140 days.

(21) Appl. No.: 13/260,215

(22) PCT Filed: Oct. 20, 2009

(86) PCT No.: PCT/CN2009/074524
§ 371 (c)(1),
(2), (4) Date: Sep. 23, 2011

(87) PCT Pub. No.: WO2011/022893
PCT Pub. Date: Mar. 3, 2011

(65) Prior Publication Data
US 2012/0016995 A1       Jan. 19, 2012

(30) Foreign Application Priority Data

Aug. 24, 2009   (CN) .......................... 2009 1 0168075

(51) Int. Cl.
*H04L 12/16*      (2006.01)
*H04L 12/66*      (2006.01)
*H04L 29/06*      (2006.01)
*H04L 12/54*      (2013.01)

(52) U.S. Cl.
CPC ........ *H04L 65/1016* (2013.01); *H04L 65/1069* (2013.01); *H04L 12/5695* (2013.01)
USPC .............................. 370/259; 370/352; 370/401

(58) Field of Classification Search
CPC ........................ H04L 12/5695; H04L 12/5692
USPC ........................ 370/230, 235, 252, 329, 437
See application file for complete search history.

(56) References Cited

U.S. PATENT DOCUMENTS 7,944,826 B2 *   5/2011   Wang ............................ 370/230
2008/0120700 A1 *   5/2008   Pandey et al. .................... 726/4
(Continued)

FOREIGN PATENT DOCUMENTS

CN        101163091 A       4/2008
CN        101262440 A       9/2008
(Continued)

OTHER PUBLICATIONS

3GPP TS 29.215 V8.1.0 "Technical Specification Group Core Network and Terminals; Policy and Charging Control (PCC) over S9 reference point; (Stage 3) Release 8", published on Mar. 2009.*

(Continued)

*Primary Examiner* — Asad Nawaz
*Assistant Examiner* — Zhaohui Yang
(74) *Attorney, Agent, or Firm* — Workman Nydegger

(57) ABSTRACT

The present invention relates to an interaction method and device between resource and admission control systems, which is applied in a case that a mobile user equipment accesses a network at a fixed network side and deploys a service of the fixed network, the method includes: the resource and admission control system of the fixed network performing, after receiving a resource request sent from an application function of the fixed network, an authorization check on the resource request, and interacting with the resource and admission control system of a mobile network to make the resource and admission control system of the mobile network perform another authorization check on the resource request; if both the authorization checks are passed, the resource and admission control system of the fixed network formulating final policy rules, and returning a resource response to the application function of the fixed network. The device comprises the resource and admission control system of the fixed network and the resource and admission control system of the mobile network. The method and device of the present invention can solve the resource and admission control problems when a mobile user equipment accesses the network at the fixed network side and deploys a service in the fixed network.

19 Claims, 6 Drawing Sheets

(56) References Cited

U.S. PATENT DOCUMENTS

| | | | |
|---|---|---|---|
| 2008/0307081 A1* | 12/2008 | Dobbins et al. | 709/223 |
| 2009/0219946 A1* | 9/2009 | Liu et al. | 370/437 |
| 2010/0074187 A1* | 3/2010 | Sun et al. | 370/329 |

FOREIGN PATENT DOCUMENTS

| | | |
|---|---|---|
| CN | 101291458 A | 10/2008 |
| CN | 101483920 A | 7/2009 |

OTHER PUBLICATIONS

International Search Report and Written Opinion from International Application No. PCT/CN2009/074524 dated May 27, 2010.

3GPP TS 23.203 V9.1.0, "$3^{rd}$ Generation Partnership Project; Technical Specification Group Services and System Aspects; Policy and charging control architecture (Release 9)" Jun. 2009.

Extended Supplementary European Search Report and Written Opinion from European Patent Application No. 09848625.1—1862/2472794 PCT/CN2009/074524. Dated Jan. 3, 2014.

* cited by examiner

INTERACTION METHOD AND DEVICE BETWEEN RESOURCE AND ADMISSION CONTROL SYSTEMS

CROSS-REFERENCE TO RELATED APPLICATIONS

This application is a U.S. Nationalization of PCT International Application No. PCT/CN2009/074524 filed 20 Oct. 2009, entitled "INTERACTION METHOD AND APPARATUS BETWEEN RESOURCE AND ADMISSION CONTROL SYSTEMS," which claims priority to Chinese Patent Application No. 200910168075.X filed 24 Aug. 2009, the contents of both of the foregoing applications are incorporated herein, in their entirety, by this reference.

FIELD OF THE INVENTION

The present invention relates to the communication field, in particular to an interaction method and device between resource and admission control systems.

BACKGROUND OF THE INVENTION

The next generation network (NGN) is a hot research topic in the current communication standard field. The NGN integrates fixed communications with mobile communications by adopting packet technologies, such as the Internet protocol (IP) technology and so on, as the bearer network technology. The NGN can provide more abundant multimedia services, such as some emerging services with real-time requirements (e.g., VoIP, video conference, multimedia distance teaching, video-on-demand or the like), and these services require that the communication network could provide efficient end-to-end quality of service (QoS) support; meanwhile, the users have increasingly high requirements on the QoS of the network. Therefore, how to provide the end-to-end QoS becomes one of the core issues of the NGN.

The international telecommunication union-telecommunication standardization sector (abbreviated as ITU-T) is the telecommunication sector of the international telecommunication union (abbreviated as ITU), which formulates standards related to resource and admission control. In the latest resource and admission control functions (abbreviated as RACF) draft published by the ITU-T, there is provided an RACF functional framework. As shown in FIG. 1, the RACF is composed of two parts which are respectively a policy decision functional entity (abbreviated as PD-FE) and a transport resource control functional entity (abbreviated as TRC-FE), where the TRC-FE interacts with the transport functions via the Rc, and interacts with a transport resource enforcement functional entity (abbreviated as TRE-FE) via the Rn, moreover, the PD-FE interacts with the TRC-FE via the Rt, interacts with a customer premises network (abbreviated as CPN) via the Rh, interacts with a policy enforcement functional entity (abbreviated as PE-FE) via the Rw, interacts with service control functions (abbreviated as SCF) of the service layer via the Rs, interacts with network attachment control functions (abbreviated as NACF) via the Ru, and interacts with other NGNs via the Ri interface.

In addition, the PD-FE is transport technology-independent and is independent of the SCF as well. The PD-FE makes a final decision of resource and admission control based on network policy rules, service information provided by the SCF, transport layer subscription information provided by the NACF, and resource availability decision results provided by the TRC-FE.

The TRC-FE is service-independent, but is transport technology-dependent. The TRC-FE is responsible for collection and maintenance of the transport network information and resource status information. After receiving a resource request from the PD-FE, the TRC-FE executes resource-based admission control based on QoS, priority requirements, resource availability information and transmission-related policy rules.

The transport layer is composed of the PE-FE and the TRE-FE. The PE-FE, as a packet-to-packet gateway which may be located between a CPN and an access network, between an access network and a core network, or between networks of different operators, executes the policy rules issued by the PD-FE. The PE-FE is a key node which supports dynamic QoS control, port address translation control and network address translation (abbreviated as NAT) traversal. The TRE-FE executes transport resource policy rules issued by the TRC-FE, and its scope, functions and Rn interface need further research, which are not in the research scope of the R2 stage.

The telecommunication and Internet converged services and protocols for advanced networking (TISPAN) proposes a resource and admission control subsystem (RACS) from the aspect of fixed access, to solve the QoS problem of the NGN bearer network. The TISPAN divides the NGN framework into a service layer and a transport layer, and introduces the RACS and a network attachment subsystem (NASS) to the transport control layer. The RACS solves the QoS problem of the NGN bearer network, and the NASS is responsible for providing independent user access management for the upper service layer. The main functions of the TISPAN RACS are similar to those of the ITU-T RACF.

The functional framework of the TISPAN RACS is shown in FIG. 2. The RACS, which is a part of the NGN, associates the resource requirements of the service layer (e.g. IMS) with the resource allocation of the bearer network layer. The RACS mainly realizes functions such as policy control, resource reservation, admission control, NAT traversal or the like. The RACS provides the control services of the transport layer for the application functions (AF) through a series of QoS policies, so that a user equipment (UE) can obtain the required service with a guaranteed QoS.

The RACS is composed of two entities: a service-based policy decision function (SPDF) and an access-resource and admission control function (A-RACF) which will be respectively described as follows.

The SPDF provides unified interfaces for the application functions, shields the underlying network topologies and specific types of access, and provides service-based policy control. The SPDF selects local policies according to a request from an application function (AF), and maps the request into QoS parameters which are transmitted to the A-RACF and a border gateway function (BGF), so as to control the corresponding resources.

The A-RACF controls the access network and has functions of admission control and network policy convergence. The A-RACF receives a request from the SPDF, and then accepts or refuses the request for the transport resources to realize the admission control based on the access network policies. The A-RACF obtains network attachment information and user QoS list (profile) information from the NASS via an e4 interface, so as to determine available network resources according to the network location information (for example, physical node address of an accessed user); meanwhile, when dealing with the resource allocation request, the A-RACF checks whether the requested bandwidth information is consistent with that described in the user access list (profile).

The transport layer is composed of two functional entities: a border gateway function (BGF) and a resource control enforcement function (RCEF).

The BGF is a packet-to-packet gateway and can be located between an access network and a core network (to realize a core border gateway function), or between two core networks (to realize an interconnection border gateway function). The BGF realizes functions including NAT traversal, gating, QoS marking, bandwidth limiting, usage measurement and resource synchronization under the control of the SPDF.

The RCEF executes the layer 2/layer 3 (L2/L3) media stream policies transmitted via the Re interface from the A-RACF to realize functions such as gating, QoS marking, bandwidth limiting, and the like.

The 3rd Generation Partnership Project (3GPP) proposes a policy control and charging (PCC) solution from the aspect of mobile access to realize the resource and admission control function. The PCC, which is placed between the service control layer and the access/bearer layer, realizes a certain QoS control mechanism aiming at the characteristics of the mobile access network. The main functions of the PCC are realizing policy control based on the customized information of the users and performing charging control based on the service data flow.

The functional framework of the 3GPP PCC is shown in FIG. 3. The policy and charging rules function (PCRF) comprises policy control deciding and charging by flow control functions. The PCRF provides the network control functions regarding PCEF-oriented service data flow-related detection, gating, QoS and charging by flow (except for the credit management).

The PCEF comprises functions including service data flow detection, policy execution, and the charging by flow, and resides in a gateway (GW). The PCEF provides service data flow detection, user plane flow processing, trigger control plane session management, QoS execution, service data flow measurement and interaction with the charging system. A subscription profile repository (SRR) stores user subscription data. The OCS and the OFCS are respectively online charging system and offline charging system, wherein, the OCS comprises a customized applications for mobile network enhanced logic service control point (CAMEL SCP) and a service data flow based credit control.

Multimedia service bandwidth in a mobile network is not as guaranteed as that in a fixed network or in a wireless local area network (WLAN) such as the WiFi, and the services provided by the multimedia broadcast/multicast service (MBMS) and the packet-switched streaming service (PSS) in the mobile network are not as abundant as IPTV services; therefore, mobile users can consider accessing IPTV services at home. As fixed networks and the mobile networks are deployed with respective resource control systems and service functions, therefore, when a mobile user (Dual-mode mobile terminal) accesses via a fixed network and accesses IPTV services thereon, in order to provide QoS support, the RACF/RACS in the fixed network needs to interact with the PCRF in the mobile network. The networking solution is shown in FIG. 4, and the PCRF is connected with the mobile user information repository. FIG. 5 further provides an interaction diagram between the RACF/RACS and the PCC. The RACF/RACS is connected with the PCC via an interface S9', which is mainly used for information interaction between the RACF/RACS and the PCC. As there are tremendous differences among the RACF, the RACS and the PCC in the aspects of framework, network coverage, and related node type, in the prior art, the functions supported by the RACF, the RACS and the PCC cannot ensure quality of user service experience in the scenes illustrated in the FIG. 4/FIG. 5. In the prior art, the problem that the RACF, the RACS and the PCC cannot work cooperatively and interactively urgently needs a solution.

SUMMARY OF THE INVENTION

In order to solve the problems of the prior art, the present invention proposes an interaction method and device between resource and admission control systems to realize the resource and admission control when the mobile user accesses at the fixed network side and visits the service of the fixed network.

The present invention provides an interaction method between resource and admission control systems applied in a case that a mobile user equipment accesses a network at a fixed network side and deploys a service of the fixed network, the method includes:

the resource and admission control system of the fixed network performing, after receiving a resource request sent from an application function of the fixed network, an authorization check on the resource request, and interacting with the resource and admission control system of a mobile network to make the resource and admission control system of the mobile network perform another authorization check on the resource request; if both the authorization checks are passed, the resource and admission control system of the fixed network formulating final policy rules, and returning a resource response to the application function of the fixed network.

Moreover, the interaction method also has the following features:

the resource and admission control system of the fixed network performs the authorization check on the resource request according to local operator policy rules and resource availability.

Moreover, the interaction method also has the following features:

the resource and admission control system of the mobile network performs the another authorization check on the resource request according to local operator policy rules and user subscription information.

Moreover, the interaction method also includes:

the resource and admission control system of the mobile network formulating, after the another authorization check on the resource request is passed, initial policy rules for the resource request, and transmitting the initial policy rules to the resource and admission control system of the fixed network.

Moreover, the interaction method also has the following features:

the resource and admission control system of the mobile network formulates the initial policy rules for the resource request according to user subscription information, local operator policy rules and service information.

Moreover, the interaction method also has the following features:

the resource and admission control system of the fixed network formulates the final policy rules according to the initial policy rules, local operator policy rules and resource availability.

Moreover, the interaction method also includes:

the resource and admission control system of the fixed network notifying, after formulating the final policy rules, a transport functional entity of the fixed network to install the final policy rules.

Moreover, the interaction method also has the following features:

the resource and admission control system of the fixed network interacts with the resource and admission control system of the mobile network via an S9' interface, and one of or both of the resource and admission control system of the fixed network and the resource and admission control system of the mobile network realizes/realize matching and conversion of message formats and parameter forms for interaction, so that information from an opposite side can be identified and processed correctly.

Moreover, the interaction method also has the following features:

for a standard of an international telecommunication union telecommunication standardization sector (ITU-T), the application function of the fixed network is service control functions (SCF), and the resource and admission control system of the fixed network is resource and admission control functions (RACF);

for a telecommunication and Internet converged services and protocols for advanced networking (TISPAN), the application function of the fixed network is an application function (AF), and the resource and admission control system of the fixed network is a resource and admission control subsystem (RACS); and the resource and admission control system of the mobile network is a policy and charging rule function (PCRF).

Moreover, the interaction method also has the following features:

the resource request is a resource initialization request, and the method includes the following steps:

after receiving the resource initialization request message from the application function of the fixed network, the resource and admission control system of the fixed network performs an authorization check on the resource initialization request message, if the authorization check is passed, then transmits the resource initialization request message to the resource and admission and control system of the mobile network;

the resource and admission control system of the mobile network performs another authorization check on the resource initialization request message, if the authorization check is passed, then formulates the initial policy rules for the resource initialization request message, returns the resource initialization response message to the resource and admission control system of the fixed network, wherein the resource initialization response message carries the initial policy rules; and the resource and admission control system of the fixed network formulates the final policy rules, and notifies the transport functional entity of the fixed network to install the final policy rules, and returns the resource initialization response message to the application function of the fixed network.

Moreover, the interaction method also has the following features:

the resource request is a resource modification request, and the method includes the following steps:

after receiving the resource modification request message from the application function of the fixed network, the resource and admission control system of the fixed network performs an authorization check on the resource modification request message, if the authorization check is passed, then transmits the resource modification request message to the resource and admission control system of the mobile network;

the resource and admission control system of the mobile network performs another authorization check on the resource modification request message, if the authorization check is passed, then formulates the initial policy rules for the resource modification request message, returns the resource modification response message to the resource and admission control system of the fixed network, wherein the resource modification response message carries the initial policy rules; and the resource and admission control system of the fixed network formulates the final policy rules, and notifies the transport functional entity of the fixed network to install the final policy rules, and returns the resource modification response message to the application function of the fixed network.

Moreover, the interaction method also includes:

if the resource and admission control system of the fixed network receives a resource release request sent from the application function of the fixed network, the resource and admission control system of the fixed network notifying a transport functional entity of the fixed network to uninstall policy rules on the transport functional entity and release a resource; the resource and admission control system of the fixed network returning a resource release response message to the application function of the fixed network.

The present invention also provides a resource and admission control system of the fixed network which supports an interaction between resource and admission control systems.

The resource and admission control system of the fixed network being configured to receive a resource request sent from an application function of the fixed network, perform an authorization check on the resource request, interact with the resource and admission control system of a mobile network to make the resource and admission control system of the mobile network perform another authorization check on the resource request, formulate final policy rules if both the authorization checks are passed, and return a resource response to the application function of the fixed network, wherein the resource request is a resource initialization request or a resource modification request; and the resource and admission control system of the fixed network is also configured to notify, after receiving a resource release request sent from the application function of the fixed network, a transport functional entity of the fixed network to uninstall policy rules on the transport functional entity and release a resource, and to return a resource release response message to the application function of the fixed network.

The present invention also provides a resource and admission control system of the mobile network which supports an interaction between resource and admission control systems.

the resource and admission control system of the mobile network being configured to perform an authorization check on a resource request sent from an application function of a fixed network, and to notify a resource and admission control system of the fixed network of an authorization check result, wherein the resource request is a resource initialization request or a resource modification request.

The present invention also provides an interaction device between resource and admission control systems which comprises the above-mentioned resource and admission control system of the fixed network and the resource and admission control system of the mobile network.

The present invention realizes the resource and admission control when the mobile user equipment accesses at the fixed network side and deploys the service of the fixed network.

PREFERABLE EMBODIMENTS OF THE INVENTION

The basic idea of the present invention is that a mobile user equipment accesses a network at a fixed network side and deploys the services of the fixed network, and interacts with a resource and admission control system (PCRF) of a mobile network through a resource and admission control system (RACF/RACS) of the fixed network, so as to realize the policy control of the services.

Specifically, after receiving a resource request sent by an application function of the fixed network, the resource and admission control system of the fixed network performs an authorization check on the resource request, and interacts with the resource and admission control system of the mobile network to make the resource and admission control system of the mobile network perform another authorization check on the resource request, if both the authorization checks are passed, the resource and admission control system of the fixed network formulates final policy rules, and returns a resource response to the application function of the fixed network.

The resource and admission control system of the fixed network interacts with the resource and admission control system of the mobile network via an S9' interface, and both of or one of the resource and admission control systems of the fixed network and the resource and admission control system of the mobile network realize(s) matching and conversion of message formats and parameter forms for interaction so that information from an opposite side can be identified and processed correctly.

In the above, for ITU-T standards, the application function of the fixed network is service control functions (SCF), and the resource and admission control system of the fixed network is resource and admission control functions (RACF);

for TISPAN, the application function of the fixed network is application functions (AF), and the resource and admission control system of the fixed network is a resource and admission control subsystem (RACS); and the resource and admission control system of the mobile network is a policy control and charging rules function (PCRF).

The present invention will be described in detail in connection with the drawings and the specific embodiments.

Embodiment 1

Figure 1:
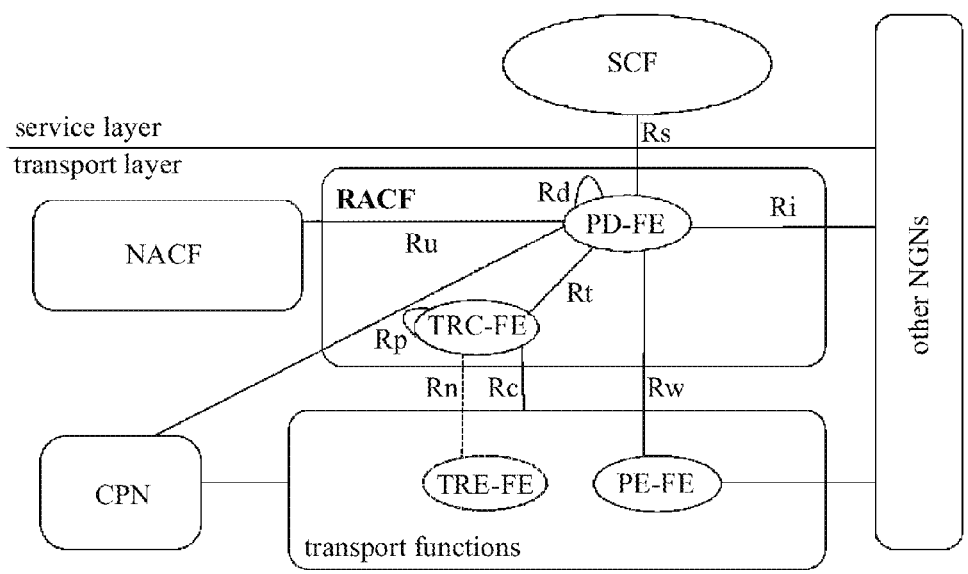
FIG. 1 is a functional framework diagram of the RACF of the ITU-T in the prior art.
Figure 2:
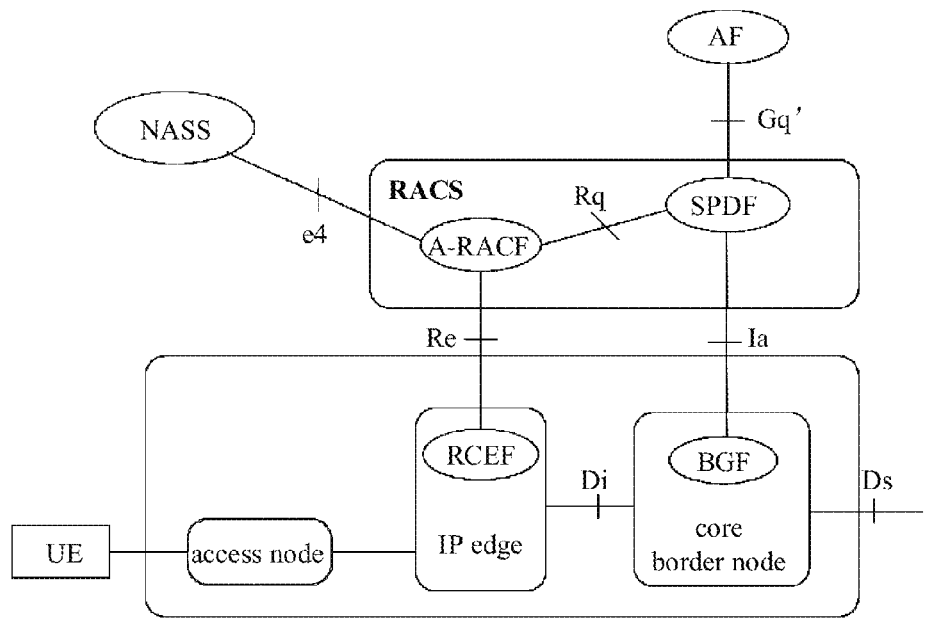
FIG. 2 is a functional framework diagram of the RACS of the TISPAN in the prior art.
Figure 3:
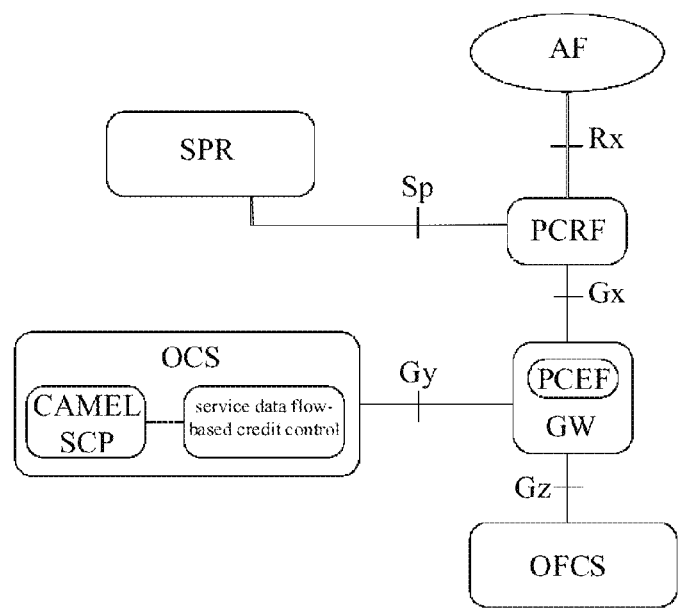
FIG. 3 is a functional framework diagram of the PCC of the 3GPP in the prior art.
Figure 4:
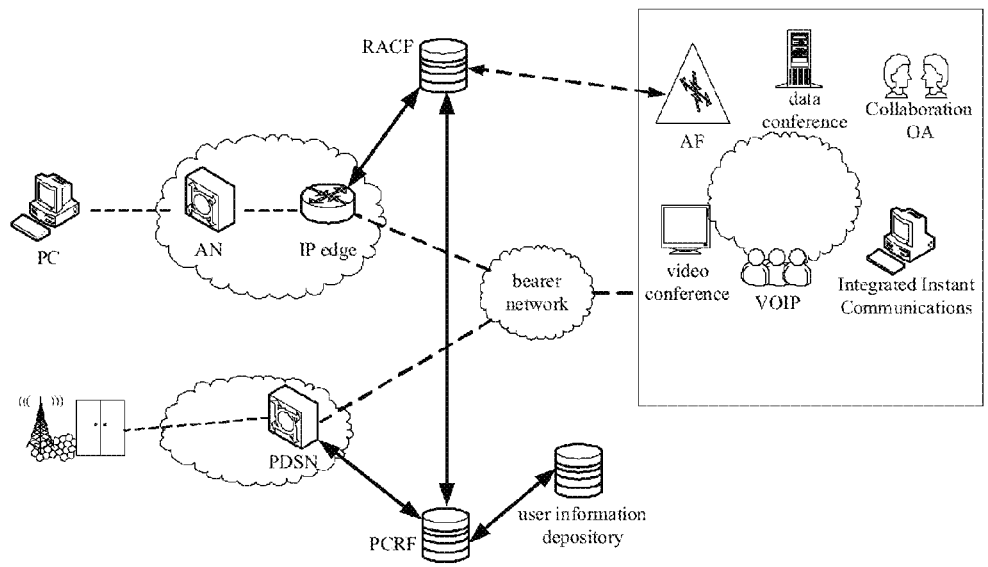
FIG. 4 is a networking diagram related to the interaction between the resource and admission control systems in the prior art.
Figure 5:
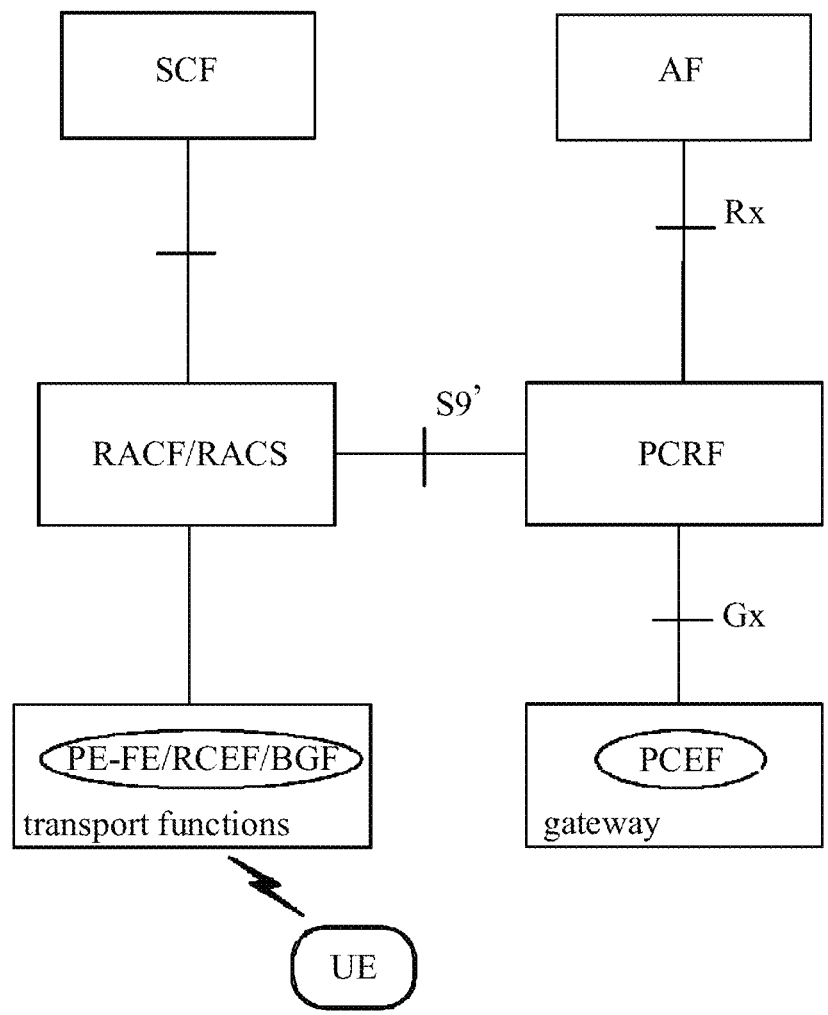
FIG. 5 is an interaction diagram between the RACF/RACS and the PCC.
Figure 6:
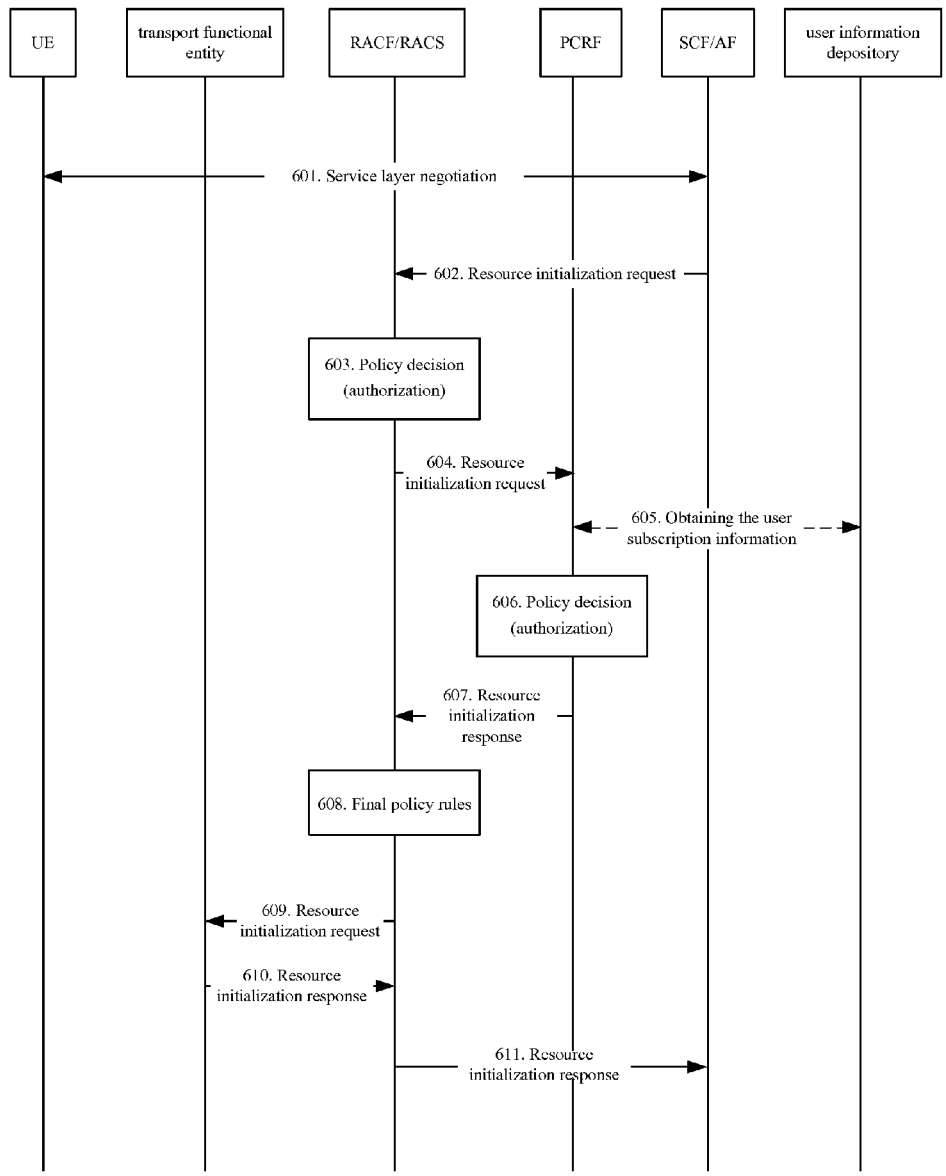
FIG. 6 is a flowchart of Embodiment 1 of the present invention.

FIG. 6 is a flowchart of Embodiment 1 of the present invention. The flowchart shows a resource initialization request flow related to the interaction between the RACF or RACS (RACF/RACS) and the PCRF when the mobile user equipment accesses the network at the fixed network side and deploys a service of the fixed network, and the flow comprises the steps as follows.

Step 601, the UE deploys the service, completes an application layer service negotiation, and triggers the SCF/AF to generate a resource initialization request.

In the above, the application layer service negotiation of the UE is to negotiate about the information of the service to be deployed such as service data flow type, address and port number used by the service data flow, bandwidth required by the service data flow, codec manner adopted by the service data flow, and priority for processing the service data flow.

Step 602, the SCF/AF transmits a resource initialization request message to the RACF/RACS.

Specifically, the SCF/AF determines QoS requirement parameters (e.g., bandwidth, service type or the like) of the requested service, and then transmits the resource initialization request message (reservation) to the RACF/RACS, with the resource initialization request message carrying the media stream description and the QoS parameters or the like, so as to request the RACF to perform QoS resource authorization and reservation.

Step 603, the RACF/RACS performs an authorization check on the request.

Specifically, the RACF/RACS performs the authorization check on the request according to local operator policy rules and the resource availability. The authorization check comprises verifying whether the requested QoS resource conforms to the local operator policy rules, deciding the access network and the core network related to the requested QoS resource, and checking the resource availability of the related networks.

Step 604, as the RACF/RACS does not have user subscription information, if the authorization check is passed, then the resource initialization request message is further transmitted to the PCRF; and if the authorization check is not passed, then the RACF/RACS returns a resource initialization response message of failure to the SCF/AF, and the subsequent steps will not be executed, wherein the message can carry a failure cause.

Step 605, after receiving the resource initialization request message, the PCRF interacts with a user information repository to obtain the user subscription information, and stores the user subscription information in a local memory.

Step 606, the PCRF performs an authorization check on the request, if the authorization check is passed, then the PCRF formulates initial policy rules for the request.

Specifically, the PCRF performs the authorization check on the request according to local operator policy rules and the user subscription information. The authorization check comprises verifying whether the requested QoS resource conforms to the local operator policy rules and the user subscription information.

The PCRF formulates the initial policy rules for the request according to the user subscription information, the local operator policy rules and the service information or the like.

In the above, if the authorization check is not passed, the PCRF returns a resource initialization response message of failure to the RACF/RACS, and the RACF/RACS returns the resource initialization response message of failure to the SCF/AF, and the subsequent steps will not be executed, wherein the resource initialization response message of failure can carry a failure cause.

Step 607, the PCRF transmits the resource initialization response message to the RACF/RACS, wherein the message carries the initial policy rules formulated by the PCRF.

Step 608, the RACF/RACS makes a policy decision according to the results of step 603 and 607, and formulates final policy rules.

Specifically, the RACF/RACS formulates the final policy rules according to the initial policy rules, the local operator policy rules, and the resource availability.

Step 609, the RACF/RACS transmits the resource initialization request message to the transport functional entity to notify the transport functional entity to install the final policy rules.

Step 610, the transport functional entity installs the final policy rules from the RACF/RACS, and returns a resource initialization response message.

Step 611, the RACF/RACS transmits the resource initialization response message to the SCF/AF.

Embodiment 2

Figure 7:
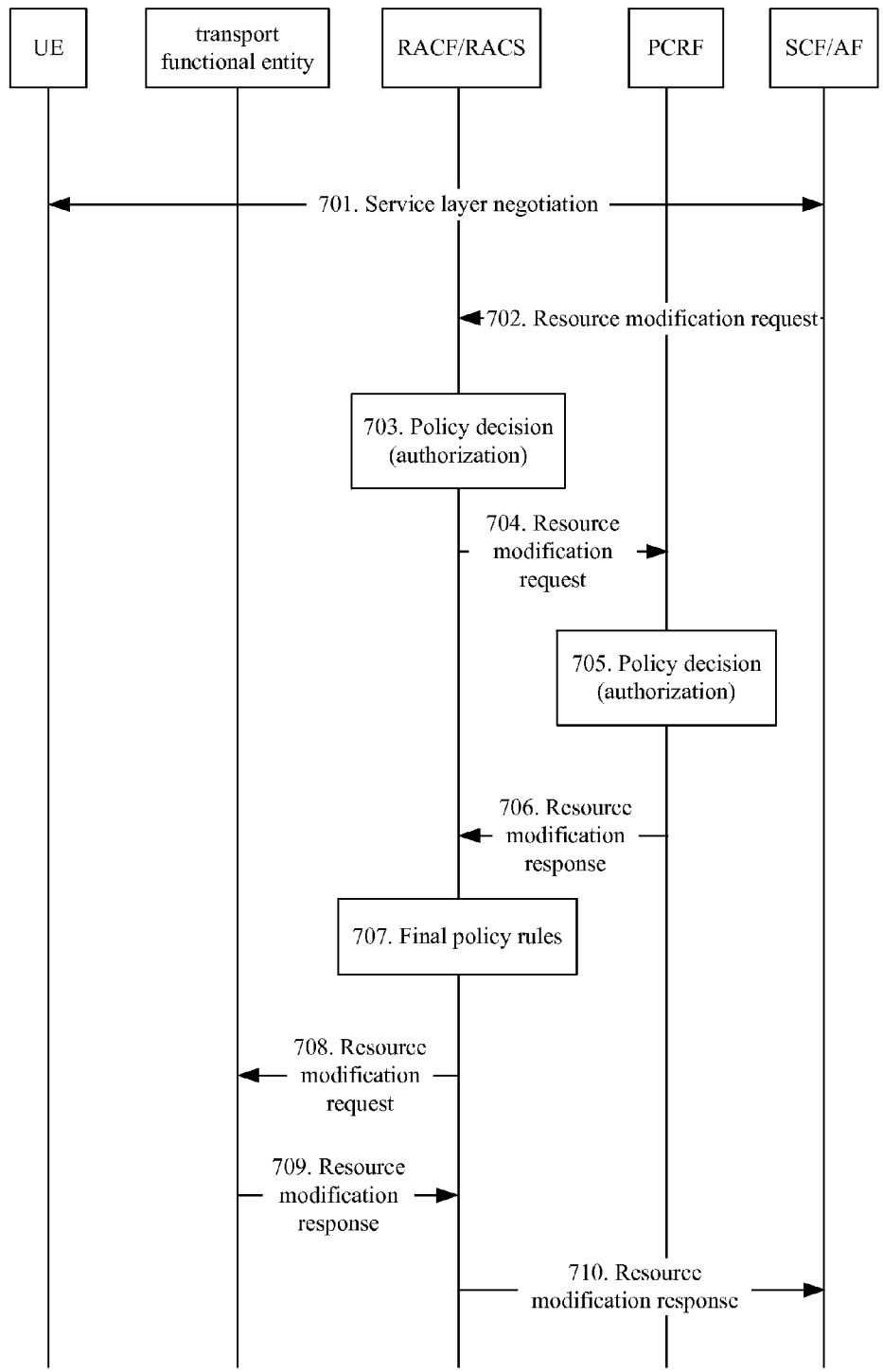
FIG. 7 is a flowchart of Embodiment 2 of the present invention.

FIG. 7 is a flowchart of Embodiment 2 of the present invention. The flowchart shows a resource modification request flow related to the interaction between the RACF/RACS and the PCRF when the mobile user equipment accesses the network at the fixed network side and deploys a service of the fixed network, and the flow comprises the steps as follows.

Step 701, the service is modified, and the UE completes a negotiation of application layer service information.

For example, the UE and the network negotiate to modify bandwidth required by the service data flow.

Step 702, the SCF/AF transmits a resource modification request message to the RACF/RACS.

Specifically, the SCF/AF determines QoS requirement parameters (e.g., the bandwidth, service type or the like) of the service to be modified, then transmits the resource modification request message to the RACF/RACS, wherein the message carries the QoS parameters that need to be modified and so on.

Step 703, the RACF/RACS performs an authorization check on the request.

Specifically, the RACF/RACS performs the authorization check on the request according to local operator policy rules and the resource availability. The authorization check comprises verifying whether the modified QoS resource conforms to the local operator policy rules; and deciding the access network and the core network related to the QoS resource to be modified, and checking the resource availability of the related networks.

Step 704, as the RACF/RACS does not have user subscription information, if the authorization check is passed, then the resource modification request message is further transmitted to the PCRF; and if the authorization check is not passed, then the RACF/RACS returns a resource modification response message of failure to the SCF/AF, and the subsequent steps will not be executed, wherein the message can carry a failure cause.

Step 705, the PCRF performs an authorization check on the request, if the authorization check is passed, then the PCRF formulates initial policy rules for the request.

Specifically, the PCRF performs the authorization check on the request according to the local operator policy rules and the user subscription information. The authorization check comprises verifying whether the modified QoS resource conforms to the local operator policy rules and the user subscription information.

The PCRF formulates the initial policy rules according to the user subscription information, the local operator policy rules and the service information or the like.

In the above, if the authorization check is not passed, the PCRF returns a resource modification response message of failure to the RACF/RACS, the RACF/RACS returns the resource modification response message of failure to the SCF/AF, and the subsequent steps will not be executed, wherein the resource modification response message of failure can carry a failure cause.

Step 706, the PCRF transmits the resource modification response message to the RACF/RACS, wherein the message carries the initial policy rules formulated by the PCRF.

Step 707, the RACF/RACS formulates final policy rules according to the results of step 703 and step 706.

Specifically, the RACF/RACS formulates the final policy rules according to the initial policy rules, the local operator policy rules, and the resource availability;

Step 708, the RACF/RACS transmits the resource modification request message to a transport functional entity to notify the transport functional entity to install the final policy rules.

Step 709, the transport functional entity installs the final policy rules from the RACF/RACS, and returns a resource modification response message.

Step 710, the RACF/RACS transmits the resource modification response message to the SCF/AF.

Embodiment 3

Figure 8:
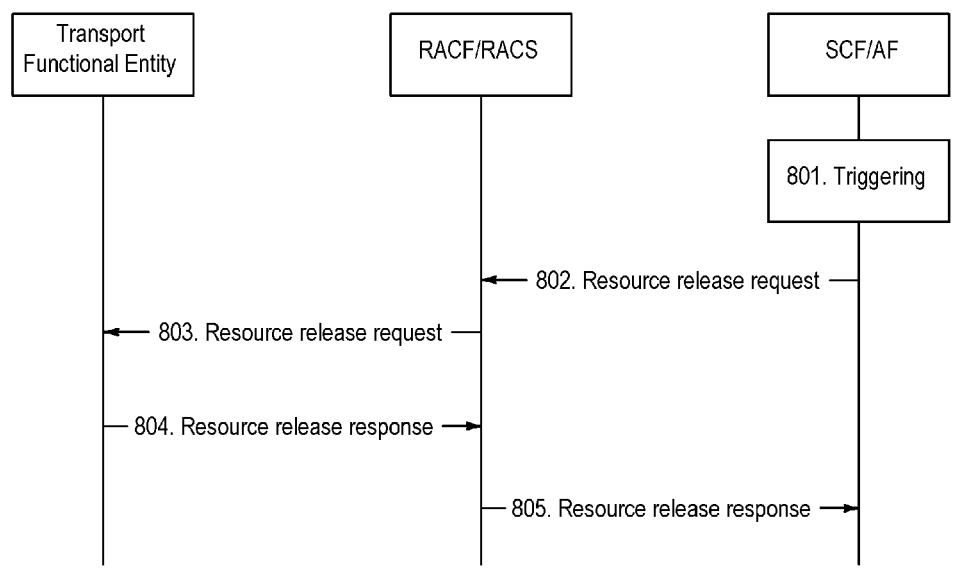
FIG. 8 is a flowchart of Embodiment 3 of the present invention.

FIG. 8 is a flowchart of Embodiment 3 of the present invention. The flowchart shows a resource release flow related to the interaction between the RACF/RACS and the PCRF when the mobile user equipment accesses the network at the fixed network side and deploys a service of the fixed network, and the flow comprises the steps as follow.

Step 801, the user initiates a service release request, transmits a release request message to the SCF/AF, and triggers the SCF/AF to generate a resource release request.

Step 802, the SCF/AF transmits the resource release request message to the RACF/RACS to release the service data flow corresponding to the service.

Step 803, the RACF/RACS transmits the resource release request message to a transport functional entity to uninstall policy rules on the transport functional entity and release the corresponding resource.

Step 804, the transport functional entity returns a resource release response message to the RACF/RACS.

Step 805, the RACF/RACS returns the resource release response message to the SCF/AF.

An interaction device between resource and admission control systems according to the embodiment of the present invention comprises the resource and admission control system of the fixed network and the resource and admission control system of the mobile network.

In the above, the resource and admission control system of the fixed network is used to perform, after receiving a resource request sent by an application function of the fixed network, an authorization check on the resource request, and interact with the resource and admission control system of the mobile network to notify the resource and admission control system of the mobile network to perform an authorization check on the resource request, if both the authorization checks are passed, then the resource and admission control system of the fixed network formulates final policy rules, and returns a resource response to the application function of the fixed network; and the resource and admission control system of the mobile network is used to perform an authorization check on the resource request and notify the resource and admission control system of the fixed network of the authorization check result.

In virtue of the above-mentioned method and device, the resource and admission control problem brought when a mobile UE accesses at a fixed network side and deploys the service of the fixed network is solved.

Of course, there are various other embodiments of the present invention. It is apparent to those skilled in the art that various alterations and changes can be made to the present invention without departing from the spirit and principle of the present invention, and the corresponding alterations and changes all belong to the protection scope defined in the claims of the present invention.

INDUSTRIAL APPLICABILITY

Compared with the prior art, the method and device of the present invention can solve the resource and admission control problems when a mobile UE accesses at a fixed network side and deploys the services of the fixed network.

What is claimed is:

1. An interaction method between resource and admission control systems, the method comprising:
in a case where a mobile user equipment:
accesses a fixed network, wherein the fixed network includes an application function and a resource and admission control system, wherein the application function of the fixed network includes at least one of service control functions (SCF) or an application function (AF) and the resource and admission control system of the fixed network includes at least one of admission control functions (RACF) and resource and admission control subsystem (RACS),
deploys a service of the fixed network, and
interacts with the resource and admission control system of a mobile network through a resource and admission control system of the fixed network to realize policy control of the service,
the resource and admission control system of the fixed network performing, after receiving a resource request sent from the application function of the fixed network, an authorization check on the resource request, if the authorization check is passed, the resource and admission control system of the fixed network transmitting the resource request to the resource and admission control system of a mobile network to make the resource and admission control system of the mobile network perform a second authorization check on the resource request
after the second authorization check on the resource request is passed, the resource and admission control system of the mobile network formulating, in response to the resource request from the resource and admission control system of the fixed network, initial policy rules for the resource request, and transmitting the initial policy rules to the resource and admission control system of the fixed network;

if both the authorization checks are passed, the resource and admission control system of the fixed network formulating final policy rules according to the initial policy rules, local operator policy rules and resource availability, and returning a resource response to the application function of the fixed network.

2. The interaction method according to claim 1, wherein, the resource and admission control system of the fixed network performs the authorization check on the resource request according to local operator policy rules and resource availability.

3. The interaction method according to claim 1, wherein, the resource and admission control system of the mobile network performs the second authorization check on the resource request according to local operator policy rules and user subscription information.

4. The interaction method according to claim 1, wherein, the resource and admission control system of the mobile network formulates the initial policy rules for the resource request according to user subscription information, local operator policy rules and service information.

5. The interaction method according to claim 1, wherein the method further comprises:
the resource and admission control system of the fixed network notifying, after formulating the final policy rules, a transport functional entity of the fixed network to install the final policy rules.

6. The interaction method according to claim 1, wherein in the step of interacting with the resource and admission control system of the mobile network:
the resource and admission control system of the fixed network interacts with the resource and admission control system of the mobile network via an S9' interface, and one of or both of the resource and admission control system of the fixed network and the resource and admission control system of the mobile network realizes/realize matching and conversion of message formats and parameter forms for interaction, so that information from an opposite side can be identified and processed correctly.

7. The interaction method according to claim 1, wherein, for a standard of an international telecommunication union telecommunication standardization sector (ITU-T), the application function of the fixed network is the service control functions (SCF), and the resource and admission control system of the fixed network is the resource and admission control functions (RACF);
for a telecommunication and Internet converged services and protocols for advanced networking (TISPAN), the application function of the fixed network is the application function (AF), and the resource and admission control system of the fixed network is the resource and admission control subsystem (RACS); and
the resource and admission control system of the mobile network is a policy and charging rule function (PCRF).

8. The interaction method according to claim 1, wherein the resource request is a resource initialization request or a resource modification request.

9. The interaction method according to claim 8, wherein the method further comprises:
if the resource and admission control system of the fixed network receives a resource release request sent from the application function of the fixed network, the resource and admission control system of the fixed network notifying a transport functional entity of the fixed network to uninstall final policy rules on the transport functional entity and release a resource; the resource and admission control system of the fixed network returning a resource release response message to the application function of the fixed network.

10. A resource and admission control system of a fixed network, the resource and admission control system of the fixed network comprising:
  a processor configured to execute program units stored on a memory connected with the processor in a case where the resource and admission control system of the fixed network supports an interaction between resource and admission control systems and interacts with a resource and admission control system of a mobile network to realize policy control of a service, wherein the program units are configured to:
  receive a resource request sent from an application function of the fixed network, perform an authorization check on the resource request, if the authorization check is passed, the resource and admission control system of the fixed network transmitting the resource request to the resource and admission control system of a mobile network to make the resource and admission control system of the mobile network perform a second authorization check on the resource request and formulate, in response to the resource request from the resource and admission control system of the fixed network, initial policy rules for the resource request after the second authorization check on the resource request is passed, receive the initial policy rules returned by the resource and admission control system of the mobile network, formulate final policy rules according to the initial policy rules, local operator policy rules and resource availability if both the authorization checks are passed, and return a resource response to the application function of the fixed network, wherein the resource request is a resource initialization request or a resource modification request; and
  notify, after receiving a resource release request sent from the application function of the fixed network, a transport functional entity of the fixed network to uninstall final policy rules on the transport functional entity and release a resource, and to return a resource release response message to the application function of the fixed network,
  wherein the application function of the fixed network includes at least one of service control functions (SCF) or an application function (AF) and the resource and admission control system of the fixed network includes at least one of admission control functions (RACF) and resource and admission control subsystem (RACS).

11. A resource and admission control system of a mobile network the resource and admission control system of the mobile network comprising:
  a processor configured to execute program units stored on a memory connected with the processor in a case where the resource and admission control system of the mobile network supports an interaction between resource and admission control systems and interacts with a resource and admission control system of a fixed network to realize policy control of a service, wherein the program units are configured to:
  receive a resource request which is sent by a resource and admission control system of the fixed network after the resource and admission control system of the fixed network receives the resource request from an application function of the fixed network;
  perform an authorization check on the resource request, after the authorization check on the resource request is passed, formulate, in response to the resource request from the resource and admission control system of the fixed network, initial policy rules for the resource request, and transmit the initial policy rules to the resource and admission control system of the fixed network and notify the resource and admission control system of the fixed network of an authorization check result, wherein the resource request is a resource initialization request or a resource modification request,
  wherein the application function of the fixed network includes at least one of service control functions (SCF) or an application function (AF) and the resource and admission control system of the fixed network includes at least one of admission control functions (RACF) and resource and admission control subsystem (RACS).

12. An interaction device between resource and admission control systems, the device comprising a resource and admission control system of a fixed network and a resource and admission control system of a mobile network, wherein
  the resource and admission control system of the fixed network comprises a processor configured to execute program units stored on a memory connected with the processor in a case where the resource and admission control system of the fixed network supports an interaction between resource and admission control systems and interacts with the resource and admission control system of the mobile network to realize policy control of a service, wherein the program units are configured to:
  receive a resource request sent from an application function of the fixed network, perform an authorization check on the resource request, if the authorization check is passed, the resource and admission control system of the fixed network transmitting the resource request to the resource and admission control system of the mobile network to make the resource and admission control system of the mobile network perform a second authorization check on the resource request and formulate, in response to the resource request from the resource and admission control system of the fixed network, initial policy rules for the resource request after the second authorization check on the resource request is passed, receive the initial policy rules returned by the resource and admission control system of the mobile network, formulate final policy rules according to the initial policy rules, local operator policy rules and resource availability if both the authorization checks are passed, and return a resource response to the application function of the fixed network, wherein the resource request is a resource initialization request or a resource modification request; and
  notify, after receiving a resource release request sent from the application function of the fixed network, a transport functional entity of the fixed network to uninstall final policy rules on the transport functional entity and release a resource, and to return a resource release response message to the application function of the fixed network;
  the resource and admission control system of the mobile network comprises a processor configured to execute program units stored on a memory connected with the processor in a case where the resource and admission control system of the mobile network supports an interaction between resource and admission control systems and interacts with the resource and admission control system of the fixed network to realize policy control of the service, wherein the program units are configured to:
  receive the resource request which is sent by the resource and admission control system of the fixed network after the resource and admission control system of the fixed network receives the resource request from the application function of the fixed network;

perform the second authorization check on the resource request, after the second authorization check on the resource request is passed, formulate, in response to the resource request from the resource and admission control system of the fixed network, initial policy rules for the resource request, and transmit the initial policy rules to the resource and admission control system of the fixed network and notify the resource and admission control system of the fixed network of an authorization check result, wherein the resource request is a resource initialization request or a resource modification request, wherein the application function of the fixed network includes at least one of service control functions (SCF) and an application function (AF) and the resource and admission control system of the fixed network includes at least one of admission control functions (RACF) and resource and admission control subsystem (RACS).

13. The interaction method according to claim 2, wherein the resource request is a resource initialization request or a resource modification request.

14. The interaction method according to claim 3, wherein the resource request is a resource initialization request or a resource modification request.

15. The interaction method according to claim 4, wherein the resource request is a resource initialization request or a resource modification request.

16. The interaction method according to claim 5, wherein the resource request is a resource initialization request or a resource modification request.

17. The interaction method according to claim 6, wherein the resource request is a resource initialization request or a resource modification request.

18. The interaction method according to claim 7, wherein the resource request is a resource initialization request or a resource modification request.

19. The interaction method according to claim 16, wherein the method further comprises:

if the resource and admission control system of the fixed network receives a resource release request sent from the application function of the fixed network, the resource and admission control system of the fixed network notifying the transport functional entity of the fixed network to uninstall the final policy rules on the transport functional entity and release a resource; the resource and admission control system of the fixed network returning a resource release response message to the application function of the fixed network.

* * * * *